United States Patent [19]

Barthel

[11] 4,154,363

[45] May 15, 1979

[54] CRYOGENIC STORAGE CONTAINER AND MANUFACTURE

[75] Inventor: Alfred Barthel, Indianapolis, Ind.

[73] Assignee: Union Carbide Corporation, New York, N.Y.

[21] Appl. No.: 633,086

[22] Filed: Nov. 18, 1975

[51] Int. Cl.$^2$ ............................................. F27B 14/00
[52] U.S. Cl. .................................................... 220/421
[58] Field of Search ....... 220/9 E, 9 LG, 15, 420–425

[56] References Cited

U.S. PATENT DOCUMENTS

| | | | |
|---|---|---|---|
| 2,592,974 | 4/1952 | Sulfrian | 220/15 |
| 3,009,600 | 11/1961 | Matsch | 220/9 LG |
| 3,179,549 | 4/1965 | Strong | 220/421 |
| 3,256,000 | 6/1966 | Howlett | 220/421 |
| 3,272,579 | 9/1966 | Leonard | 220/421 |
| 4,027,379 | 6/1977 | Cheng | 220/421 |

OTHER PUBLICATIONS

E. I. DuPont Brochure S-4, Apr. 1970.

Primary Examiner—Robert I. Smith
Attorney, Agent, or Firm—John C. LeFever

[57] ABSTRACT

In a double walled cryogenic storage container provided with a vacuum space, a composite multi-layer insulation in said space comprising thin radiation layers separated by permanently precompressed sheets weighing less than 2 gms/ft.$^2$ composed of selected organic fibers of at least 1 micron diameter bonded together and having a water regain value less than 1%; and activated carbon adsorbent.

15 Claims, 4 Drawing Figures

CRYOGENIC STORAGE CONTAINER AND MANUFACTURE

BACKGROUND OF THE INVENTION

This invention relates to a double-walled vacuum insulated container for product storage at cryogenic temperatures, and a method for manufacturing same.

Double-walled vacuum insulated containers are widely used for the long-term preservation of living tissue, sperm and whole blood and for storage and transportation of valuable cryogenic liquids. These containers usually employ in the vacuum insulation space, a composite multi-layered, external load-free insulation comprising low conductive fibrous sheet material layers composed of fibers for reducing heat transfer by gaseous conduction, and thin flexible sheet radiation barrier layers. The radiation barrier layers are supportably carried in superimposed relation by the fibrous sheet layers to provide a large number of radiation barrier layers in a limited space for reducing the transmission of radiant heat across the vacuum space without perceptively increasing the heat transmission by solid conduction thereacross. Each radiation barrier layer is disposed in contiguous relation on opposite sides with a layer of the fibrous sheet material, the fibers being oriented substantially parallel to the radiation barrier layers and substantially perpendicular to the direction of heat inleak across the insulating space.

One such commonly used fibrous sheet material described in Matsch U.S. Pat. No. 3,009,600 is small diameter glass fibers (about 0.5 microns diameter) in permanently precompacted sheets of about 1.5 mils thick and weighing about 1.5 gms. per sq. ft. (hereinafter referred to as "glass microfiber"). The extreme fineness of glass microfiber affords mechanical integrity of the separator in very thin sheet form without reliance on chemical binders to "glue" the fibers together. When an insulation comprising glass microfiber sheets alternating with thin aluminum foils is installed at near-optimum density of 70 layers/inch and in a vacuum of less than 0.1 micron Hg absolute, its thermal conductivity is about $2.5 \times 10^{-5}$ Btu/hr.ft.°F. If a 29-liter liquid nitrogen container is provided with such an insulation, it is capable of obtaining a normal evaporation rate (NER) of about 0.33 lbs. of the liquid nitrogen per day.

The disadvantages of glass microfiber are its high cost and its extreme sensitivity to mechanical compression. The latter characteristic has been explained as the result of increasing the number of fiber-to-fiber contacts within the sheet which in effect shortens the path of heat flow between the reflective foils separated by the sheet. In practical usage of thin permanently precompacted-form spacers in multiple layer insulation, it is usually impossible to avoid high compression at least in localized areas of the insulation.

An alternative glass fiber material, described in Clapsadle U.S. Pat. No. 3,145,515, is large diameter (1.6–2.6 micron) fibers in fluffy uncompacted "web" sheets without significant binder. Lack of strength and poor handleability, characteristics of this separator, are accommodated by supporting the fiber sheet continuously on another, stronger sheet material such as the reflective foil used in the insulation. Thus, the supporting foil may be interleaved with the delicate fiber sheet at the time the latter is produced, and thereafter, the two components are handled and applied together during vessel manufacture as a single composite layer. The resultant multi-layer insulation is excellent for large vessels requiring moderately effective insulation, but its thermal conductivity (about $10 \times 10^{-5}$ Btu/hr.ft.°F.) does not meet the extreme requirements for small cryogenic containers with long "holding" time.

An alternative to glass fiber sheets are the organic fiber separators described in Gibbon et al U.S. Pat. No. 3,265,236 having certain specifications including much lower intrinsic thermal conductivity than glass. By way of example, the patent states that with a rayon fiber, a minimum thermal conductivity for multi-layer insulation is obtained which is equal to glass fiber multi-layer insulation, but with fiber 16 to 24 times larger in diameter. In order to obtain strength and good handling characteristics with large fibers in thin sheets, the patent contemplates the use of binders such as polyvinylacetate in quantity such as 14 wt.% of the sheet. Sheet materials weighing 1.475 and 1.01 gms/ft.$^2$ are disclosed. In addition to rayon, other disclosed suitable organic fiber materials are cotton, Dacron, Dynel and nylon. Dacron is a polyester produced by condensation of dimethylterephthalate, nylon is a polyamide and Dynel is a copolymer of vinyl chloride-acrylonitrile.

According to the Gibbon et al patent, fiber sheets may be produced from these organic materials using either paper-making or textile machinery. Textile sheets have not been used in commercial installations, however, due to relatively high cost and poor thermal efficiency. In paper-making machinery, the fibers are laid down on a moving screen and are compressed while wet as between rolls, so that after drying, the paper retains a compressed condition. Sheet materials produced of large diameter rayon fibers (e.g., 12–18 microns), in low thicknesses (e.g., 1–2 mils) and in light weight (e.g., 0.8 to 1.5 gms/ft.$^2$) afford excellent separators for composite insulations. One such material applied at near-optimum layer density of about 70 layers per inch provides a thermal conductivity on the order of $2 \times 10^{-5}$ Btu/hr.ft.°F. The fiber sheets are reasonable in cost, being readily produced on wet-process, paper-making machinery.

Unfortunately, use of certain of the aforementioned organic fibers presents other problems. The rayon fiber and many other organic fibers have a strong affinity for water. When exposed to atmosphere of normal humidity, such fibers absorb large amounts of water, amounts between 8 to 20% of the fiber weight being typical. When these are evacuated, the absorbed water is evolved profusely over a wide pressure range and over extended periods of time.

When multiple-layer insulations are installed between the walls of a cryogenic vessel and evacuated, suitable provision must be made in the insulation space for immobilizing gases which evolve from materials exposed to the vacuum and which inadvertently enter the space through minute leaks. The usual means for scavenging these gases is a highly active adsorbent such as molecular sieve 5A (calcium zeolite A) which is installed against the cold outer wall of the inner vessel as disclosed in Loveday U.S. Pat. No. 2,900,800. The absorbent, when chilled to liquid nitrogen temperature, has a very high affinity for most atmospheric gases. Its capacity for water is even higher and since pre-adsorption of water reduces its capacity for oxygen, nitrogen and argon, it must be installed in a pre-dried condition and exposed to normal humid atmosphere for minimum time prior to sealing and evacuating the insulation space. When thus installed, a relatively small quantity of molecular sieve 5A is capable of maintaining absolute pressure below 0.5 micron Hg during cold service conditions. Hydrogen is also evolved in vacuum insulation spaces and is not readily immobilized by physical adsorbents. However, hydrogen gas can be removed by reaction on a suitable getter such as palladium oxide as disclosed in Matsch et al U.S. Pat. No. 3,108,706.

Whereas satisfactory double-walled cryogenic storage containers can be produced from materials and by procedures outlined above, the evacuation of such containers in expensive and time consuming. This final step in the manufacturing procedure becomes a serious bottleneck in production, requires a large number of evacuation stations in a factory, consumes substantial amounts of energy, and increases significantly the production costs of the containers. The time required for evacuation usually far exceeds 8 hours so that this terminal step extends over into one or more days processing time. In this procedure the space between the inner vessel and the outer casing is evacuated for an external period of time to remove not only the free gases from the space but also adsorbed gases from the huge surface areas of the shields, fibers, walls and absorbent within the insulation space. Initial evacuation by a mechanical pump to a pressure in the insulation space on the order of 1000 microns Hg proceeds quickly, usually in less than 15 minutes time. Then evacuation is switched to a diffusion pump for a much longer period of time to remove the slowly desorbing gases from the insulation space. The final pressure will typically fall below 50 microns Hg.

When the vessel is placed in service and the adsorbent is chilled to cryogenic temperature, the adsorbent "captures" and immobilizes remaining gas within the space and produces the desired low absolute pressure below 0.5 micron Hg. and preferably below 0.1 micron. However, a quantity of adsorbent which can be reasonably accommodated in the vacuum space will not be able to produce this low pressure or maintain such pressure for extended service life unless the preadsorbed gases are effectively pumped away from the insulation system during manufacture.

A typical evacuation pressure-time curve for a prior art container is shown in FIG. 1 as the next-to-highest curve A. The container is 29-liter capacity and is provided with rayon fiber sheet-aluminum foil multi-layer insulation and molecular sieve 5A adsorbent. As stated above, the pressure drops rapidly to a level between 100 and 1000 microns but then decreases slowly. Experience in commercial production has shown that a minimum evacuation period of 18 hours and preferably 24 hours is required to obtain satisfactory insulation performance with this system. If such extended evacuation is not performed, the necessary service vacuum of less than 0.5 micron Hg will not be obtained or maintained in the insulation.

One object of this invention is to provide an improved multi-layered thermal insulation system for the vacuum space of double-walled cryogenic storage containers, characterized by low heat conductance, low material costs, and which is easily and quickly evacuated during production prior to usage.

Another object of the invention is to provide an improved method for manufacturing a double-walled cryogenic storage container employing organic fiber type multi-layered thermal insulation which does not require predrying of the fibrous sheet, a dry adsorbent and assembly in a dehumidified atmosphere.

Other objects will be apparent from the ensuing disclosure and appended claims.

SUMMARY

This invention relates to an improved thermal insulation system for the vacuum space of a double-walled container for storing materials at low temperature, and a method for manufacturing such a container.

The container is of general type which comprises an inner vessel for holding material at low temperature, a larger outer gas-tight casing having rigid self-supporting walls around the inner vessel of such size to form an intervening evacuated load-free space at an absolute pressure less than about 0.5 micron mercury. This space contains multi-layered thermal insulation comprising thin flexible sheet radiation barriers supported by and in alternating relation with low conductive organic fibrous sheet layers in the permanently precompacted form. In this invention the fibrous sheet layers have a water regain value of less than 1% by weight, weigh less than 2 grams/ft.$^2$, being comprised of fibers having an intrinsic thermal conductivity of less than 0.2 Btu/hr.ft.°F. and an effective diameter of at least 1 micron. The fibers are arranged in random overlaying crossing relationship in planes parallel to the sheet surface with at least some of the contact points between fibers bonded together. The fibers are selected from the group consisting of polyolefins, polyesters, poly(vinyl chloride), poly(vinylidene chloride) and copolymers of acrylonitrile and vinyl chloride. Activated carbon adsorbent material is provided in contiguous relationship with the outer surface of the inner vessel and has water adsorptivity of less than 2% by weight.

In the manufacturing method of this invention, activated carbon adsorbent material having water adsorptivity of less than 2% by weight is positioned in contiguous relationship with the inner vessel outer surface in gas equilibrim contact with atmospheric air. Sheet material is provided as the fibrous layers having a water regain value of less than 1% by weight, weighing less than about 2 grams/ft.$^2$, being comprised of fibers having an intrinsic thermal conductivity of less than 0.2 Btu/hr.ft.°F. and an effective diameter of at least 1 micron, and fibers arranged in random overlaying crossing relationship in planes parallel to the sheet surface with at least some of the contact points between fibers bonded together. The fibers are selected from the group consisting of polyolefins, polyesters, poly(vinyl chloride), poly(vinylidene chloride) and copolymers of acrylonitrile and vinyl chloride. The fibrous layer sheet and radiation barriers are wrapped around the inner vessel in alternate layers so as to provide at least 30 layers of sheet radiation barriers per inch of multi-layered insulation thickness in the wrapped position with the wrapping being performed in gas equilibrium contact with atmospheric air. The outer casing is positioned around the outer surface of the wrapped multi-layered insulation so as to form an evacuable space. The latter is evacuated sufficiently to reduce the pressure in this space to below 70 microns mercury at ambient temperature in less than 6 hours. The evacuated space is then sealed.

DESCRIPTION OF PREFERRED EMBODIMENTS

Figure 1:
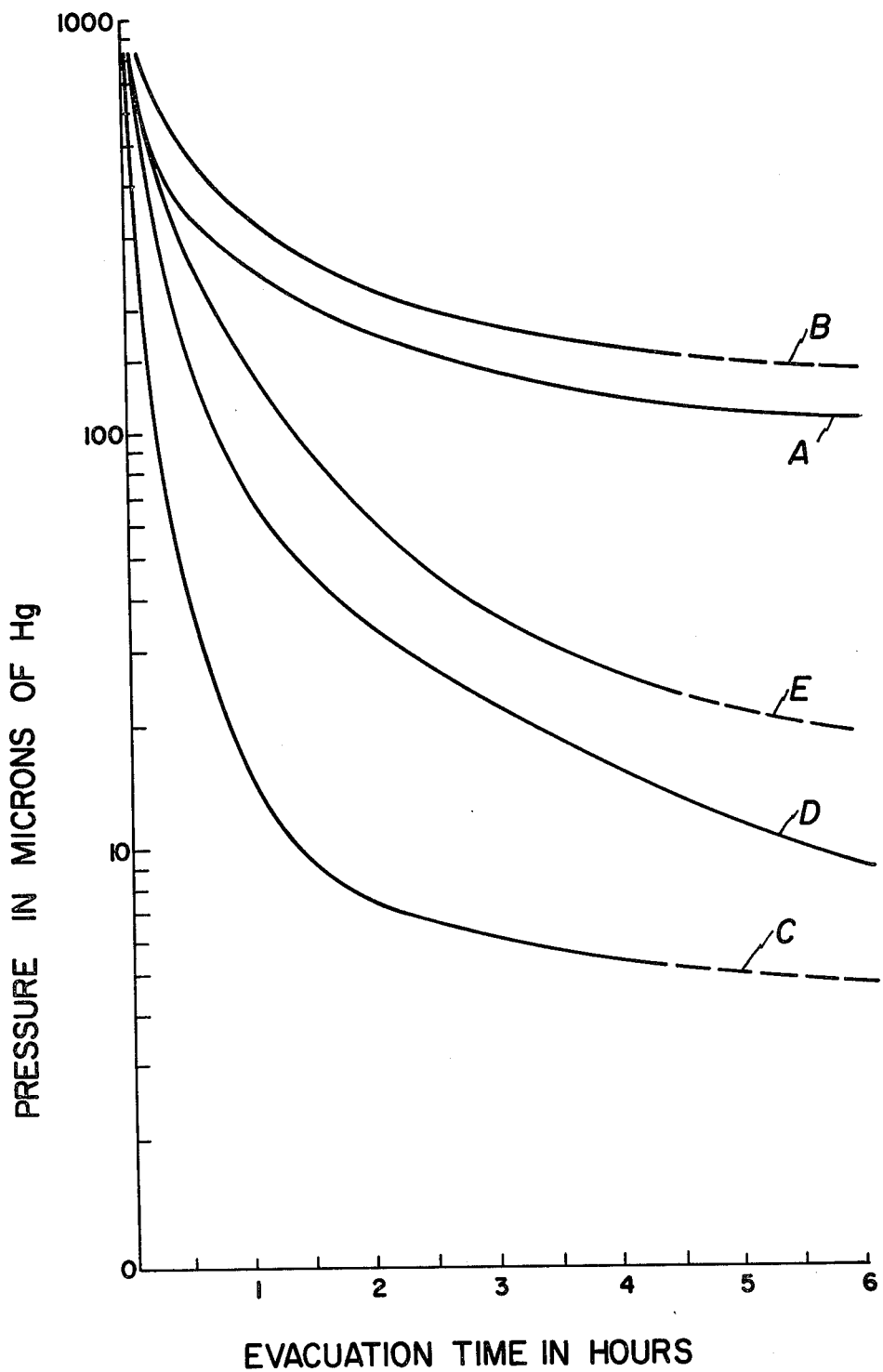
FIG. 1 is a graph showing the room temperature evacuation pressure for various composite multi-layer and adsorbent systems as a function of the evacuation time.

As used herein, "water regain value" is an arbitrary figure formally adopted as the regain to be used with the oven-dry weight when calculating the commercial or legal weight of shipments on deliveries of any specific textile material, as defined in the ASTM standard D 1909-68 (Reapproved 1973). Representative values listed therein include the following:

| Fiber | water regain percent |
|---|---|
| Acrylic | 1.5 |
| Natural Cotton Yarn | 7.0 |
| Glass | 0.0 |
| Hemp | 12.0 |
| Modacrylic Class I | 0.4 |
| Nylon (polyamide) | 4.5 |
| Olefin | 0.0 |
| Polyester | 0.4 |
| Rayon | 11.0 |
| Saran | 0.0 |
| Spandex | 1.3 |
| Vindal | 4.5 |
| Vinyon | 0.0 |
| Wool | 13.6 |

"Effective diameter" is the diameter of a circular fiber having the same cross-sectional area of solid material as the fiber being measured. By way of example, if the fiber is solid and circular, effective diameter is the as-measured diameter. If the fiber is hollow, effective diameter is based on measurement of the actual fiber material ignoring the lumen. If the fiber has a non-circular cross section, effective diameter is determined by measuring the actual cross-sectional area and calculating the diameter of a circular cross-section having the same cross sectional area. If the fiber diameter varies from end-to-end, effective diameter is an average value.

As used herein, the "water adsorptivity" of carbon adsorbent is based on the oven-drying measuring procedure outlined in the ASTM standard D 2867-70 for materials without non-water miscible organic compounds.

In the manufacturing method of this invention, both the carbon adsorbent material positioning and the fibrous layer sheet - radiation barrier wrapping are performed in gas equilibrium contact with atmospheric air. This refers to both pressure and composition equilibrium. By way of example, manufacturing may be performed in any enclosed space without dehumidification. It should be understood that air conditioning of such space is not required for purposes of this method but is not precluded if desirable for unrelated reasons.

The fiber sheets of this invention may be produced by a variety of methods well known in the papermaking and textile arts. They may be produced by wet process from slurries of papermaking or staple fibers or deposited dry in continuous fiber form commonly referred to as spun bonding. The fibers may be homogeneous in chemical composition and physical properties, or blends of fibers differing in composition and properties may be employed. Binders are commonly used in papermaking and are acceptable for purposes of this invention as long as their characteristically high water adsorptivity does not increase the water regain value of the fiber sheet in excess of 1%. The adverse effect of high water regain value will be discussed hereinafter, and demonstrated by comparison of curves B and E in FIG. 1.

In spun bonding the individual fibers are secured in the sheet by occasional heat fusion of fiber-to-fiber contact points. Such heat fusion between fibers accounts for the strength and compactness of the sheet and non-fiber binders are not employed. By way of illustration, one spun bonding method is described in Petersen U.S. Pat. No. 3,502,538 and Levy U.S. Pat. No. 3,296,944 whereby a blend of two fibers having different softening points is laid in web form and is subsequently heated in a current of hot gas such as steam to bond the fibers together. In another spun bonding technique, homogeneous or blended fibers are heat bonded by heated rolls under light compression. In yet another example, Vosburgh U.S. Pat. No. 3,368,934 describes a pattern of spun bonding whereby the fibers are heat fused at numerous tiny localized spots by passage through hot embossed rolls.

It will be apparent from the foregoing that in specifying the fiber sheet as having at least some of the contact points between fibers bonded together, the bonding may be directly between contiguous fibers or through an intermediate binder. Direct fiber bonding is preferred to form multilayered insulations in alternating relation with radiation barriers having lower thermal conductivity, as claimed in a copending U.S. patent application "Thermal Insulation" filed contemporaneously in the name of Alfred Barthel.

As previously mentioned, only certain types of organic fibers are suitable for practice of this invention. Suitable polyolefins include polyethylene, as for example sold by Thiokol Chemical Corp., Waynesboro, Oh., under the designation "DPL", and polypropylene, as for example sold under the trademark "Herculon" by Hercules Inc., Wilmington, Dela. Suitable polyesters include certain of those sold under the trademarks Dacron (E. I. DuPont) and Kodel (Tennessee Eastman Co., Kingsport, Tenn.). A suitable poly(vinylidene chloride) fiber is sold by Amtech Inc., Odenton, Md., possibly manufactured for material obtained from Dow Chemical Co., Midland, Mich., under the trademark "Saran". Most vinyl polymer-type fibers have water regain values exceeding 1% and are unsatisfactory. One suitable copolymer of acrylonitrile and vinyl chloride is sold by Union Carbide Corporation under the trademark "Dynel". Most acrylic-type fibers have prohibitively high water regain values. A suitable poly (vinyl chloride) is sold under the name vinyon by FMC Corp., Philadelphia, Pa.

The effective diameter of the individual fibers comprising the fibrous sheet is at least 1 micron, preferably less than 30 microns, and most preferably 3 to 30 microns. Fibers less than 1 micron effective diameter probably do not require bonding and relatively large fibers excessively increase heat transfer by solid conduction, and also the fibrous sheet thickness. The latter characteristic reduces the number of radiation shields which can be installed per inch of multi-layer insulation thickness. However, larger diameter fibers tend to be less expensive. The aforementioned range is a balance of these characteristics.

As previously mentioned, the present fibrous sheet layers weigh less than 2 grams/ft$^2$, preferably less than 1.5 grams/ft$^2$. This is in part because the multi-layered thermal insulation of this invention must be very effective as minimizing total heat transfer by solid conduction and radiation. Use of thin, light sheets effectively separates adjacent radiation barriers whereas denser fibrous sheets employ more fibers and increase heat transfer by solid conduction. As hereinafter discussed in greater detail and illustrated in FIG. 4, the individual fibers are believed to "float" or undulate in point-to-point contact between adjacent radiation barriers, and denser sheets would reduce this characteristic. Also, the use of low density thin fibrous sheets permits a larger number of radiation shields per inch without unduly compressing the fibrous sheets.

Any activated carbon adsorbent material having water adsorptivity of less than 2% by weight is suitable (preferably less than 1%), and many are commercially available having surface area of 800–1250 meters$^2$/gm. Carbon adsorbents are for example manufactured from petroleum or coal base material, and may be purchased from Union Carbide Corporation as "Columbia" grades JXC, MBV and MBU. Suitable activated carbon is also sold by Witco Chemicals Company, New York City, N.Y., as grade 337.

Returning now to FIG. 1, curves A through E illustrate the evacuation pressure versus evacuation time relationship characteristics of various composite multi-layer and adsorbent systems including the prior art and the present invention. In each instance the multi-layered insulation was wrapped in the same orbital manner (and to the same density) described in Barthel U.S. Pat. No. 3,504,820 without simultaneous spiral wrapping, around an identical 29-liter vessel. The sheet radiation barrier was soft aluminum foil, 0.3 mil thick and 3 inches wide, and the permanently precompacted fibrous sheet was 3⅞ inch wide. The various multilayered fiber sheet-aluminum foil thermal insulation and adsorbent systems were as follows:

TABLE I

| Curve | Fiber Insulation | Adsorbant |
|---|---|---|
| A | rayon | molecular sieve 5A |
| B | rayon | activated carbon |
| C | polyester | molecular sieve 5A |
| D | polyester plus manila floc | molecular sieve 5A |
| E-1 | polyester | activated carbon |
| E-2 | polyolefin | activated carbon |

In most instances the FIG. 1 curves are mean values based on the individual performances of several identical systems. Curve E depicts both the polyester E-1 and polyolefin E-2 activated carbon systems since their experimental performances were substantially identical for purposes of this comparison.

The rayon fiber sheet of curves A and B weighed about 0.84 grams/ft.$^2$, composed of fibers having an intrinsic thermal conductivity of 0.12–0.21 Btu/hr.ft.°F., and an effective diameter of 12 microns and a water regain value of 11 weight %. The polyester fiber sheet of curves C and E-1 weighed about 1.26 grams/ft.$^2$, composed of fibers having an intrinsic thermal conductivity of 0.095 BTu/hr.ft.°F., and an effective diameter of 17 microns and a water regain value of 0.4 weight %. This polyester fiber sheet was the spun bonded type, purchased from E. I. Dupont de Nemours and Co., Wilmington, Del., under the trademark "Reemay". The polyolefin fiber sheet of curve E-2 weighed about 1.35 grams/ft.$^2$, composed of fibers having an intrinsic thermal conductivity of 0.0725 Btu/hr.ft.°F., and an effective diameter of 27 microns and a water regain value of less than 0.01 weight %. This polyolefin sheet was polypropylene of the spun bonded type, purchased from Acme Mills Company, 5151 Loraine Avenue, Detroit, Mich., under the trademark "Fibertex", style 9. On inspection, the fiber sheet was heat fused in a square pattern of tiny localized areas each about 1/32-inch$^2$ and spaced about 12/inch so that about 16% of the fiber sheet surface area was fused. The polyester plus manila fiber sheet of curve D weighed about 0.86 grams/ft.$^2$, composed of fibers having an effective diameter of 13 microns and a water regain value of 1.6 weight %. This sheet was formed from 90 weight % polyester fibers having a water regain of 0.4 weight % and 10% by weight manila fiber floc having a water regain of 12 weight %, hence the fiber sheet water regain value of $0.4+0.1(12)=1.6$ weight %. This fiber sheet was prepared by the "wet" method used in paper manufacturing, with the manila fiber floc as binder. It was purchased from James R. Crampton and Bros. Ltd., Elton Paper Mills, Bury, Lancashire, BL82AS, Great Britain.

The molecular sieve 5A adsorbent was calcium zeolite A in the form of 1/16-inch diameter × ⅛ inch clay-bonded pellets manufactured by Union Carbide Corporation, New York. The activated carbon was derived from petroleum base material with a surface area of 1250 meters$^2$/gm. and a water adsorptivity of 1 weight %. It was manufactured by Union Carbide Corporation and is sold under the trademark Columbia JXC carbon.

A comparison of the FIG. 1 curves reveals that for the commercially used rayon fiber sheet - molecular sieve 5A adsorbent system depicted by curve A, the pressure after 4 hours evacuation was still about 120 microns Hg. If activated carbon adsorbent is used instead of molecular sieve 5A, the evacuation pressure after 4 hours is even higher, about 160 microns Hg as depicted by curve B. This is due to the much lower adsorptivity of activated carbon for air and water.

When polyester fiber sheet is used with molecular sieve 5A adsorbent, the evacuation characteristic is greatly improved as depicted by curves C and D. After 4 hours evacuation, the polyester fiber sheet - molecular sieve 5A system provides a pressure of only about 5.4 microns Hg (curve C) and the polyester plus manila fiber floc - molecular sieve 5A system provides a pressure of about 15 microns Hg (curve D). The difference in performance between these two materials is attributed to water regain values, i.e., 0.4% for curve C and 1.6% for curve D.

For the polyester or polyolefin fiber sheet-activated carbon adsorbent systems of this invention depicted by curve E of FIG. 1, the pressure after 4 hours evacuation was about 26 microns Hg. This is between the performance of the present commercial system of curve A (120 microns Hg) and the apparent improvement of polyester fiber sheet curves C and D (5.4 and 14 microns Hg).

It would appear from the aforedescribed evacuation pressure - time comparisons that the ideal system for cryogenic storage containers would be a polyester or polyolefin fiber sheet - molecular sieve 5A adsorbent. Despite the foregoing, I have unexpectedly discovered that the polyester or polyolefin fiber sheet-activated carbon adsorbent system to be far superior as demonstrated by another series of tests. In the latter the aforedescribed fiber sheet-adsorbent systems were sealed after 4 hours evacuation and the normal evaporation rate (NER) of each container was measured. This was done by placing the container on a beam balance and filling same with about 30 lbs. of liquid nitrogen. The container was then allowed to cool down for at least two days to reach steady state conditions in the rate of heat transfer. After the cooldown, the vacuum pressure was measured and two readings were taken separated by at least two days. The weight loss between the two readings served as a basis to calculate the NER per day with the following results:

TABLE II

| Curve | NER (liquid nitrogen lbs./day) | Vacuum Pressure (mm Hg) | | |
|---|---|---|---|---|
| | | High | Low | Mean |
| A | 0.307 | 1.95 | 0.6 | 1.11 |
| B | 0.329 | 0.45 | 0.25 | 0.34 |
| C | 0.290 | 0.08 | 0.07 | 0.07 |
| E-1 | 0.248 | 0.02 | 0.02 | 0.02 |
| E-2 | 0.257 | 0.22 | 0.037 | 0.06 |

In the Table II tests, NER values are arithmetic averages of several individual performances of several identical systems. A comparison reveals that the curve A rayon fiber sheet-molecular sieve 5A system (typifying present commercial practice) was about 19% poorer than the curve E-2 polyolefin fiber sheet-activated carbon system and about 24% poorer than the curve E-1 polyester fiber sheet-activated carbon system of this invention. The curve B rayon-activated carbon system NER performance was inferior to the commercially employed curve A system. Even though the curve C polyester fiber sheet-molecular sieve 5A adsorbent system had the lowest pressure at the end of the 4 hour evacuation (FIG. 1), its NER was significantly inferior to the system of this invention. By way of direct comparison, it is about 13% poorer than the E-2 system and about 17% poorer than the E-1 system. The Table II tests are of great economic significance, particularly when compared with present commercial practice based on the aforedescribed rayon fiber sheet-molecular sieve 5A system. In commercial manufacture of the aforementioned 29 liter capacity container with this thermal insulation - adsorbent system, it has been found necessary to evacuate the intervening space for a period of at least 40 hours to achieve a commercially acceptable NER of 0.272 lbs. liquid nitrogen/day. Table II demonstrates that this invention achieves the same level of performance in no more than 4 hours evacuation time, i.e., one-tenth of the time required by the prior art organic fiber system. It also demonstrates the possibility of achieving a significantly lower NER than previously attainable in organic fiber systems. This means a longer "holding time" for storing products at cryogenic temperatures. By way of example, biological samples such as bacterial cultures, malignant cell tissues, whole blood and bone marrow are kept at $-320°$ F. for medical research. The holding time for the 29 liter capacity container based on an NER of 0.272 is about 190 days. With this invention and based on the curve E-1 NER of 0.248, the holding time may be increased to 208 days before the container needs to be refilled with liquid nitrogen, which is more than two weeks improvement.

Figure 3:
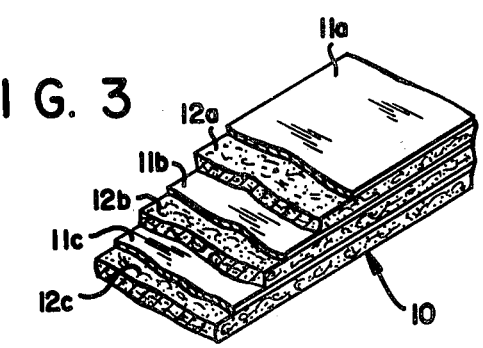
FIG. 3 is an isometric view of the composite multi-layer thermal insulation in a flattened position with parts broken away to expose underlying layers.

In the drawings, FIG. 3 shows multi-layer thermal insulation 10 comprising a plurality of thin flexible sheet radiation barriers 11 supported by and in alternative relation with low conductive organic fibrous sheet layers 12 in the permanently precompacted form. Radiation barriers 11 are preferably aluminum foils $\frac{1}{4}$ to $\frac{1}{2}$ mils thick having surface emissivity of about 0.035. However, metal plated plastics such as doubly aluminized polyethylene terephthalate may also be used as radiation barriers.

Multi-layer insulation 10 is applied to the inner vessel wall with low compression preferably so as to provide a balanced relationship between sufficient radiation barriers to greatly reduce heat transfer by radiation on one hand, but not with sufficient compression to greatly increase heat transfer by solid conduction. By way of example, each multi-layer insulation is characterized by a thermal performance curve which is a plot of thermal conductivity as a function of layer density, e.g. number of radiation shields per inch in the as-installed condition. The curve exhibits a minimum thermal conductivity at some value of layer density, and for this invention the multi-layer insulation 10 is at least 30 radiation shields per inch installed thickness, preferably between 40 and 80 radiation shields per inch installed thickness.

Figure 4:
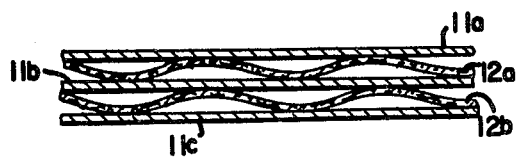
FIG. 4 is an elevated view taken in cross-section of a multi-layer insulation according to the present invention.

FIG. 4 is an enlarged view of the thermal insulation 10 which is believed to depict the heat transfer relationship between the individual layers. The thin permanently precompacted fibrous sheet layers 12 do not fill the space between the radiation shields 11 as does a fluffy web-form separator of the type described in Matsch U.S. Pat. No 3,009,601, but instead it undulates within the spacing between adjacent radiation shields over a transverse distance substantially wider than its thickness, contacting first one shield 11a than the other facing shield 11b. For example, in a 70 radiation shield-/inch multi-layer insulation, the space occupied by $\frac{1}{4}$ mil thick aluminum foils is $70 \times 0.00025 = 0.0175$ inch. The uncompressed stack-height of 70 layers of thin permanently precompacted fibrous sheets 12 will typically be about 0.5 inch. Thus, the combined thicknesses of the aluminum foils and fibrous sheets account for only $0.0175 + 0.5 =$ about 0.52 inch of the full-inch dimension.

It appears from the foregoing that the mechanism of heat transport between adjacent radiation shields 11a and 11b involves another mode in addition to the well known heat flow from fiber-to-fiber at cross-contact points in order to traverse the thickness of fibrous sheets 12. The heat must additionally travel greatly extended distances along the length of the fibers in order to traverse laterally along the undulation from contact zones between the fibrous sheet and facing radiation shields 11a and 11b.

This altered mechanism is advantageous in that the heat transfer path from shield-to-shield is greatly extended which tends to reduce the heat transport by solid conduction through the multi-layer insulation. The tendency to reduce solid conduction is greater when fibers are composed of organic substances with low intrinsic conductivity of less than 0.2 Btu/hr.ft.°F. In the use of a relatively few, large diameter fibers (at least 1 micron) to compose the sheet 12 weighing less than 2 grams/ft.$^2$, the altered heat transfer mechanism is particularly advantageous because it permits the use of discrete quantities of binder to obtain thinness and strength without incurring a large solid conductive penalty. In effect, the extension of the heat flow path along the fiber length tends to subordinate the importance of cross-contact resistancy between the fibers. Thus, the overall effect is minimized by bonding some of the cross-contact points together.

Figure 2:
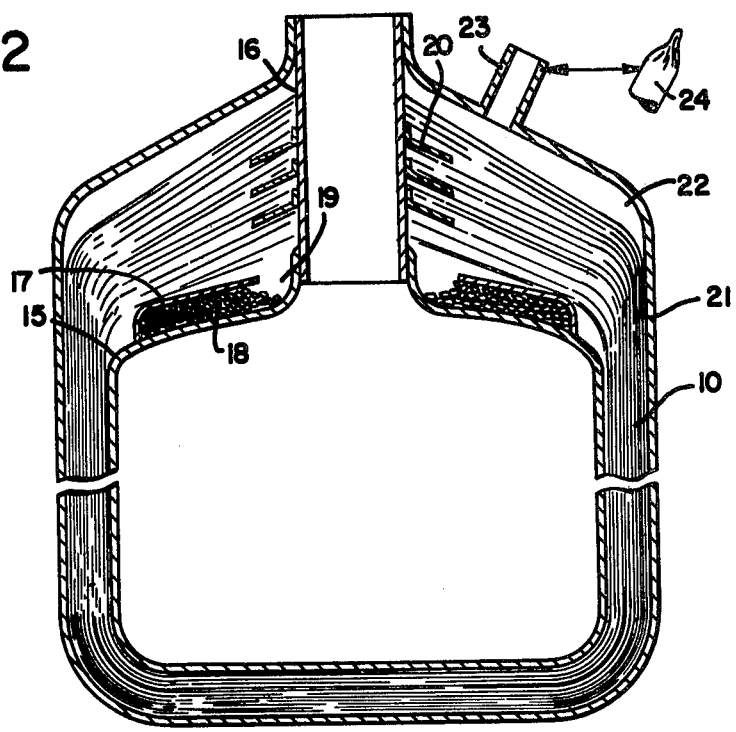
FIG. 2 is a front elevational view partly in section, of a double-walled liquefied gas container in which the invention may be practiced.

The manufacturing method of this invention will be more fully understood in connection with the following description for assembly of the FIG. 2 container. Inner vessel 15 is provided with elongated neck tube section 16 for ingress and egress, and adsorbent retainer 17 may be placed on top of inner vessel 15 in concentric relation to the neck tube. A predetermined amount of activated carbon adsorbent material 18, preferably in granular form, is poured through the ring-shaped opening 19 between retainer 17 and the neck tube 16 outer wall. The adsorbent 18 is thus positioned in contiguous relationship with the outer wall of inner vessel 15, and this assembly step is performed in an environment which is in gas equilibrim contact with atmospheric air.

Next the multi-layered insulation 10 is wrapped around (and over) the adsorbent retainer 17 and inner vessel 15 to the desired insulation density. To achieve the order-of-magnitude thermal insulating efficiency required for low temperature storage (about $2 \times 10^{-5}$ Btu/hr.ft.°F.), at least 30 layers of radiation barriers are required per inch of installed layered insulation 10 (i.e. per inch of insulation thickness). The insulation wrapping is also performed in an environment which is in gas equilibrium contact with atmospheric air. Wrapping can be done in any convenient manner, for example by the orbital procedure alone, or by simultaneous orbital and spiral movement of separate insulation strips around the inner vessel, or by spiral wrap alone. If the latter is employed it may be convenient to cut a multiplicity of disc-shaped radiation barriers and fibrous sheets and position same beneath and above inner vessel 15. If desired, a multiplicity of thermally conductive shields 20 of the type described in Paivanas et al U.S. Pat. No. 3,133,422 and Barthel U.S. Pat. No. 3,341,052 may be positioned at selected locations or intervals during the multi-layer insulation wrapping.

When orbital wrapping is employed, the conductive shields are conveniently provided by simply discontinuing application of the fibrous separator for one complete layer of the foil around the inner vessel. Such method of applying conductive metal shields was used for the previously described 29 liter test vessel, the test results being summarized in FIG. 1 plus Tables I and II. The application of conductive shields by orbital wrapping of foil strip alone requires special provision for achieving good thermal contact with the neck tube 16. For such purpose, frusto-conical sections 20 of thin conductive metal such as aluminum are conveniently clamped tightly around the neck tube 16 with their outwardly extending surface in contiguous contact with the foil layer. In the previously described tests, three frusto-conical sections formed from 1/32-inch thick aluminum sheeting as 6¼ inch diameter disks were used as heat conductive shields as described in Barthel U.S. Pat. No. 3,341,052. The wrapping procedure was to first apply 24–36 orbits of fiber sheet-foil insulation, then apply several single foil layers (without the fiber sheet) thermally joining them to the first heat shield, next apply 40–60 orbits of the fiber sheet-foil followed by further single aluminum foil layers thermally joined to the second shield, then 60–76 orbits of the fiber-sheet foil followed by further single aluminum foil layers thermally jointed to the third heat shield, and finally 72–90 orbits of fiber sheet-foil. This resulted in an average of 55 layers of the fiber sheet-aluminum foil multi-layered insulation.

Following the insulation wrapping, outer casing 21 is assembled around the insulation 10 outer surface to form an intervening evacuable load-free space 22. As used herein "load-free" means that the walls of inner vessel 15 and outer casing 21 are self-supporting and do not transmit pressure to the insulation 10. Space 22 is evacuated through connector 23 sufficient to reduce the pressure therein to below 70 microns Hg at ambient temperature. This level of evacuation is necessary to provide a double-walled container having sufficient heat insulating effectiveness for storage of material at low temperature. Space 22 is preferably evacuated sufficiently to lower the pressure therein to between 10 and 40 microns Hg as a balance between heat insulating effectiveness at the high level versus evacuation energy and time at the low level. As previously discussed, according to the instant method such evacuation is performed in less than 6 hours, preferably in less than 4 hours to minimize evacuation energy and time while still attaining high insulating effectiveness at low temperature, i.e. low NER. In two containers with a curve E-1 insulation system, the evacuation times were reduced to 20 minutes. Despite this extremely short time the vacuum levels during cold sevice were low: 0.02 micron Hg (high), 0.005 micron Hg (low), and 0.008 micron Hg (mean). The average NER was 0.265 lbs./days liquid nitrogen.

It will be understood that no all components of air are immobilized by absorbents and getters when in service. Trace elements such as helium and neon are neither effectively adsorbed at liquid nitrogen temperature nor chemically bound by getters. Although present in only minute amounts in air, they may contribute a substantial fraction of the free mobile gases under service conditions. Therefore, evacuation to low absolute pressure is necessary irrespective of the amount or activity of adsorbent, in order to remove such trace components to tolerable residual levels.

After evacuation space 22 is gas-tightly sealed as for example by pinching off the connector 23 at its outer end 24 as shown in FIG. 2A. Although not illustrated getter material may also be provided in gas communication with the evacuated space 22, as for example described in the aforementioned Matsch et al. U.S. Pat. No. 3,108,706. In contrast to the adsorbent, the getter material capsule should be joined to the warm outer casing 21 rather than cold inner vessel 15.

The remarkable advantages of this invention as compared with other fiber sheet-radiation shield insulation and adsorbent systems are due to a combination of characteristics. As previously mentioned, the rayon fiber and many other organic fibers have a strong affinity for water. On the other hand, the organic fibers selected for this invention possess low affinity for water, having water regain values of less than 1% by weight, preferably less than 0.5%. When the rayon and similar hydrophilic fibers are evacuated, the adsorbed water is evolved profusely over a wide pressure range and over extended periods of time. In contrast, the evolution of water from the organic fibers selected for this invention is much less profuse and the remaining traces of water left after a short evacuation period can be readily removed by the activated carbon adsorbent when it is chilled by the cryogenic liquid contained in the inner vessel 15.

Whereas molecular sieve 5A adsorbent has a strong affinity for air (e.g. 15 cc air per gram adsorbent), the activated carbon adsorbent used in this invention has much lower affinity for air, typically adsorbing only 5 to 8 cc air per gram adsorbent. Moreover, the adsorbed air is held very "loosely" so that it evolves in a matter of minutes during a short period of evacuation.

Afer the insulation system is sealed, an active molecular sieve 5A adsorbent will take up semi-permanently the major portion of any water which evolves from the fiber during evacuation due to the sieve's strong affinity for water. Thus, the molecular sieve assists in the evacuation of the vessel and an "extra" quantity of sieve must be provided in the container to accommodate this adsorption of water so that sufficient additional capacity will be available to immobilize gases other than water during service. In contrast, activated carbon has such low affinity for water at room temperature and pressure (less than 2% by weight), preferably less than 1% by weight that it does not require pre-drying or special handling precautions during container assembly. It may be installed in normal atmosphere with equilibrium water content. Moreover, its typically small water content is held very loosely at room temperature so that all water evolves freely and rapidly over a very short period of evacuation.

The above discoveries and conclusions are thus applied to each of the systems previously discussed in connection with FIG. 1. Curve A (rayon fiber and molecular sieve 5A adsorbent), drops rapidly in pressure when evacuation commences due to the initial assistance of the adsorbent in removing water evolved from the fiber. Both the continued long-term evolution of water from the fiber and air from the molecular sieve 5A adsorbent prevent obtaining a low pressure during evacuation and require an extended evacuation period for effective removal of air and water. Curve C (polyester fiber and molecular 5A adsorbent) drops rapidly in pressure to a low level when evacuation commences due to the great reduction in evolution of water from the essentially "dry" fiber. However, some water adsorption by the molecular sieve 5A adsorbent does occur and continued, long-term evolution of air from the 5A adsorbent requires an exended evacuation period for effective removal of adsorbed air to activate the 5A adsorbent adequately. Curve E (polyester or polyolefin fiber and activated carbon adsorbent) drops rapidly in pressure when evacuation commences because there is very little water that evolves from the fibers and fhe activated carbon adsorbent. The pressure attained during extended evacuation is much lower than for curve A because evolution of water from the hydrophobic fibers and the activated carbon adsorbent combined of curve E is much lower than from the rayon fiber of curve A, since there was very little water present at the onset. However, the extended evacuation pressure for curve E is higher than the curve C because the net evolution of water for curve C is lower, reflecting the assistance by the 5A adsorbent in the latter system. Despite this apparent advantage of being present, the molecular sieve 5A adsorbent must still be evacuated for a long period to remove the tenaciously held gas molecules. The curve B combination (rayon fiber and activated carbon adsorbent) produces a curve above curve A because the evolution of water is greatest from this system which combines a "wet" fiber and an adsorbent which does not take up water.

It is important to bear in mind that the evacuation step cannot be shortened significantly by increasing the size or capacity of the evacuation pumps. Except for an initial short period of evacuation, the rate of removal of gas is controlled by the slow rate of desorption of gas within the insulation space. In the present invention, the adsorbed gas is not only reduced drastically in quantity, but such gas is also held far less tenaciously on the "host" surfaces. The gases desorb readily at room temperature and are removed quickly by evacuation.

In addition to the greatly reduced evacuation time, the present invention affords other important advantages. As previously mentioned, the molecular sieve 5A adsorbent must be pre-dried (typically between 600° and 800° F.) and carefully protected from the atmosphere during handling, installation and assembly of the vessel. This is accomplished by pre-packaging the activated adsorbent in an inpervious metal-plastic laminate, installing the package, and perforating the laminate immediately prior to the application of the insulation which in turn must be followed immediately by the final closure of the container's outer casing. The procedure is completely obviated with the activated carbon adsorbent. The latter can be handled and installed in direct exposure to normal atmosphere without detriment to performance of the container during storage of materials at low temperature. This lack of sensitivity of carbon to adsorbed water is an important distinguishing characteristic of this adsorbent. Even though the carbon is substantially saturated with moisture under normal atmospheric conditions, its adsorptive capacity for gases remains high under service conditions, i.e. cryogenic temperature and hard vacuum. By comparison, if molecular sieve 5A were substantially saturated with moisture under normal atmospheric conditions, its adsorptive capacity at service conditions is virtually destroyed.

It was also stated that "extra" molecular sieve 5A must be introduced in order to provide capacity not only for removing the air components during low temperature service but also for unavoidably adsorbing large quantities of water evolved from a wet fiber during evacuation. The total carbon adsorbent requirement in the practice of this invention is only one-third the needed quantity of molecular sieve 5A. The difference in adsorbent quantities is significant since both weight and space are important considerations in small cryogenic containers.

Finally, the water absorbency of rayon and similar organic fibers having water regain values exceeding 1% is too high to permit such fiber to be employed as vacuum insulation without being pre-dried. In the present commerical manufacture of double-walled containers, rayon fiber sheets of the curve A and B type are "baked" in an electric oven, then stored in an absolutely dry nitrogen atmosphere and wrapped around the inner vessel in a special "dry" room. Such pre-processing procedures are expensive, time consuming and substantially increase the possibility for excessive numbers of unacceptable containers in production. The fiber separators of this invention do not require special pre-treatment and are installed in "as-received" condition. Due to the absence of "bake-out" ovens, special rooms with elaborate temperature-moisture controls, and greatly reduced evacuation times, energy consumption associated with insulation handling can be reduced between 80% and 90% with this invention compared to the present state of art.

Although preferred embodiments of the invention have been described in detail, it is contemplated that modifications may be made and that some features may be employed without others, all within the spirit and scope of the invention.

What is claimed is:

1. A container for storing materials at low temperatures comprising an inner vessel for holding such material; a larger outer gas-tight casing having rigid self-supporting walls around said inner vessel of such size to form an intervening evacuated load-free space at an absolute pressure less than about 0.5 micron mercury, said space containing multi-layered thermal insulation comprising thin flexible sheet radiation barriers supported by and in alternating relation with low conductive organic fibrous sheet layers in the permanently precompacted form having a water regain value of less than 1% by weight, weighing less than 2 grams/ft.$^2$ and being comprised of fibers having an intrinsic thermal conductivity of less than 0.2 Btu/hr.ft.°F. and an effective diameter of at least 1 micron, said fibers being arranged in random overlaying crossing relationship in planes parallel to the sheet surface with at least some of the cross points between fibers bonded together, said fibers being selected from the group consisting of polyolefins, polyesters, poly(vinyl chloride), poly(vinylidene chloride) and copolymers of acrylonitrile and vinyl chloride; and activated carbon adsorbent material in contiguous relationship with the outer surface of said inner vessel, said carbon adsorbent having water adsorptivity of less than 2% by weight.

2. A container according to claim 1 wherein the fiber is a polyolefin.

3. A container according to claim 2 wherein the fiber is polypropylene.

4. A container according to claim 1 wherein the fiber is a polyester.

5. A container according to claim 1 wherein the fibers of said sheet layers are heat bonded together without external binder at said cross points.

6. A container according to claim 1 wherein said fibrous sheet layers weigh less than 1.5 grams/ft$^2$.

7. A container according to claim 1 wherein the effective diameter of said fiber is less than 30 microns.

8. A container according to claim 1 wherein the effective diameter of said fiber is 3 to 30 microns.

9. A container according to claim 1 wherein the water regain value of said fibrous sheet layers is less than 0.5%.

10. A container according to claim 1 wherein the water adsorptivity of said carbon adsorbent is less than 1% by weight.

11. In the manufacture of double-walled containers for storing materials at low temperatures having an inner vessel for holding such material, a larger outer gas-tight casing having rigid self-supporting walls around said inner vessel of such size to from an intervening evacuated load-free space at an absolute pressure less than about 0.5 micron mercury; adsorbent material in said space in contigious relation with the outer surface of said inner vessel and multi-layered thermal insulation also in said space wrapped around said inner vessel comprising thin flexible sheet radiation barriers being supported by and in alternate relation with low conductive organic fibrous sheet layers in the permanently precompacted form, the improvement comprising the steps of: positioning activated carbon absorbent material having water adsorptivity of less than 2% by weight in contiguous relationship with the inner vessel outer surface in equilibrium contact with atmospheric air; providing as said fibrous layers, sheet having a water regain value of less than 1% by weight, weighing less than about 2 grams/ft.$^2$ and being comprised of fibers having an intrinsic thermal conductivity of less than 0.2 Btu/hr.ft.°F., and an effective diameter of at least 1 micron, said fibers arranged in random overlaying crossing relation in planes parallel to the sheet surface with at least some of the contact points between fibers bonded together, said fibers being selected from the group consisting of polyolefins, polyesters, poly (vinyl chloride), poly (vinylidene chloride) and copolymers of acrylonitrile and vinyl chloride; wrapping said fibrous layer sheet and said radiation barriers around said inner vessel in alternate layers so as to provide least last 30 layers of sheet radiation barriers per inch of multi-layered insulation thickness in the wrapped position with said wrapping being performed in equilibrium contact with atmospheric air; positioning said outer casing around the outer surface of the wrapped multi-layered insulation so as to form said evacuable space; and evacuating said space sufficiently to reduce the pressure therein to below 70 microns mercury at ambient temperature in less than 6 hours; and thereafter sealing the evacuated space.

12. A manufacturing method according to claim 11 wherein said fibrous layer sheet and radiation barriers are wrapped around said inner vessel so as to provide betweeen 40 and 80 layers of sheet radiation barriers per inch of multi-layer insulation thickness.

13. A manufacturing method according to claim 11 wherein said space is evacuated sufficiently to reduce the pressure therein to between 10 and 40 microns Hg.

14. A manufacturing method according to claim 11 wherein said space is evacuated for a period of less than 4 hours.

15. A manufacturing method according to claim 11 wherein the fibers of said fibrous sheet layers are heat bonded together without external binder at said cross points.

* * * * *